US009351216B2

(12) United States Patent
Wu (10) Patent No.: US 9,351,216 B2
(45) Date of Patent: May 24, 2016

(54) SUPPORTING A BASE STATION TO ENTER AND LEAVE SLEEP MODE IN A WIRELESS COMMUNICATION SYSTEM (71) Applicant: ZTE (USA) INC., Richardson, TX (US)

(72) Inventor: Huaming Wu, San Diego, CA (US)

(73) Assignee: ZTE (USA) INC., Austin, TX (US)

(*) Notice: Subject to any disclaimer, the term of this patent is extended or adjusted under 35 U.S.C. 154(b) by 0 days.

(21) Appl. No.: 14/439,627

(22) PCT Filed: Oct. 29, 2013

(86) PCT No.: PCT/US2013/067326
§ 371 (c)(1),
(2) Date: Apr. 29, 2015

(87) PCT Pub. No.: WO2014/070785
PCT Pub. Date: May 8, 2014

(65) Prior Publication Data
US 2015/0245270 A1    Aug. 27, 2015

Related U.S. Application Data (60) Provisional application No. 61/719,898, filed on Oct. 29, 2012.

(51) Int. Cl.
*H04W 4/00* (2009.01)
*H04W 36/22* (2009.01)
*H04W 52/02* (2009.01)
*H04W 24/02* (2009.01)
*H04W 40/00* (2009.01)

(52) U.S. Cl.
CPC .............. *H04W 36/22* (2013.01); *H04W 24/02* (2013.01); *H04W 40/005* (2013.01); *H04W 52/0206* (2013.01)

(58) Field of Classification Search
None
See application file for complete search history.

(56) References Cited

U.S. PATENT DOCUMENTS

| 2010/0210255 A1* | 8/2010 | Amirijoo | H04W 74/002 455/419 |
| 2011/0319110 A1* | 12/2011 | Futaki | H04W 24/02 455/507 |
| 2013/0122913 A1* | 5/2013 | Agarwal | H04W 24/02 455/439 |

FOREIGN PATENT DOCUMENTS

KR    20110118814 A    11/2011

OTHER PUBLICATIONS

Capone, Looking Beyond Green Cellular Networks, IEEE, Jan. 9, 2012, 4 pgs.
Saker, Minimizing Energy Consumption via Sleep Mode in Green Base Station, IEEE, Apr. 18-20, 2010, 6 pgs.
ZTE (USA) Inc., International Search Report and Written Opinion, PCT/US2013/067326, Feb. 28, 2014, 10 pgs.
ZTE (USA) Inc., International Preliminary Report on Patentability, PCT/US2013/067326, May 5, 2015, 7 pgs.
ZTE USA, Inc., Communication Pursuant to Rule 161(2) and 162 EPC, EP13850895-7, Jul. 10, 2015, 2 pgs.

* cited by examiner

Primary Examiner — Edan Orgad
Assistant Examiner — Rebecca Song
(74) Attorney, Agent, or Firm — Morgan, Lewis & Bockius LLP (57) ABSTRACT Two methods of managing the operation mode of a first base station and a second base station are provided. One method uses an operation mode controller that sends respective resource usage status requests to the first and second base stations and receives respective resource usage information reports from the base stations. If the UE resource usage information associated with the first base station and the second base station satisfies a predefined condition, the operation mode controller sends a sleep/wakeup command to the first base station, the sleep command including instructions for the first base station to hand over its UE to the second base station. Next, the operation mode controller notifies the second base station that the first base station is going to enter a predefined sleep or wakeup mode, the wakeup notification including instructions for the second base station to hand over its UE to the first base station. In the other method, a sleep mode request and a corresponding sleep mode response are exchanged directly between a first base station and a second base station. The first base station enters a predefined sleep mode if the second base station responds to the sleep mode request from the first base station.

12 Claims, 7 Drawing Sheets

| Resource usage status request 200 |
|---|
| Cell ID 210 |
| All UE in the cell (1/0) 215 |
| List of UE IDs to report 220 |
| Measurement Time Interval 225 |
| Report Period 230 |

FIG. 2C

| Resource usage information report 240 | |
|---|---|
| Cell ID 245 | |
| All UE in the cell (1/0) 250 | |
| Resource usage information 255 | |
| (UE ID, Usage string) 260-1 | |
| (UE ID, Usage string) 260-2 | |
| ... | |

FIG. 2D

| Sleep/Wakeup command 265 |
|---|
| Cell ID 270 |
| Sleep or Wake up (1/0) 275 |
| List of UE for handover 280 |
| (UE IDs, Cell ID) 285-1 |
| (UE IDs, Cell ID) 285-2 |
| ... |

Sleep mode response 440
- Source Cell ID 445
- Target Cell ID 450
- Accept or Decline (1/0) 455
- List of UE IDs for handover 460
  - UE ID 465-1
  - UE ID 465-2
  - ...
- Sleep Start Time 470
- Sleep End Time 475

FIG. 3C

Sleep mode request 400
- Source Cell ID 405
- Target Cell ID 410
- Sleep Start Time 415
- Sleep End Time 420
- List of UE for handover 425
  - (UE ID, Usage string) 430-1
  - (UE ID, Usage string) 430-2
  - ...

FIG. 3B

SUPPORTING A BASE STATION TO ENTER AND LEAVE SLEEP MODE IN A WIRELESS COMMUNICATION SYSTEM

CROSS REFERENCE TO RELATED APPLICATIONS

This Application is a United States National Stage Application filed under 35 U.S.C. §371 of PCT Patent Application Serial No. PCT/US2013/067326 filed on Oct. 29, 2013, which claims the benefit of and priority to U.S. Provisional Patent Application No. 61/719,898 filed on Oct. 29, 2012, which is hereby incorporated by reference in its entirety.

TECHNICAL FIELD

The present invention generally relates to wireless communication, and in particular, to methods of supporting a base station to enter and leave sleep mode when the base station's traffic load satisfies a predefined condition.

BACKGROUND

Power consumption of a wireless communication system is increasingly a concern as people use more and more mobile communication devices such as cell phones and tablets. A large number of base stations have been deployed to support the increasing number of mobile communication devices. Those base stations contribute a major portion of the power consumption of a wireless communication system. But little effort has been made to reduce the power consumption of base stations without adversely affecting the performance of the wireless communication system.

SUMMARY

In accordance with some embodiments, a method of managing the operation mode of a first base station and a second base station using an operation mode controller, the method comprises: sending, from the operation mode controller, a respective resource usage status request to each of the first base station and the second base station, the request including a cell ID, UE identity information, and a resource usage measurement time interval; receiving, at the operation mode controller, a respective resource usage information report from each of the first base station and the second base station, the report including a cell ID, UE identity information, and UE resource usage information measured within a corresponding resource usage measurement time interval; if the UE resource usage information associated with the first base station and the second base station satisfies a predefined condition: sending a sleep/wakeup command to the first base station, the sleep command including instructions for the first base station to hand over its UE to the second base station; and notifying the second base station that the first base station is going to enter a predefined sleep or wakeup mode, the wakeup notification including instructions for the second base station to hand over its UE to the first base station.

In some embodiments, the operation mode controller operates on a mobility management (MME) server.

In some embodiments, the UE identity information in the resource usage status request includes a parameter requiring that a base station should report the resource usage of every UE within a cell associated with the base station.

In some embodiments, the UE identity information in the resource usage status request includes a set of UE IDs, each UE ID identifying a respective UE within a cell associated with the base station for which the base station should report its resource usage.

In some embodiments, the resource usage measurement time interval is defined by a number of subframes.

In some embodiments, the resource usage status request includes a parameter indicating whether the base station should report the resource usage of every UE within a cell associated with the base station in a periodic manner.

In some embodiments, the resource usage status request is a complete message by itself.

In some embodiments, the resource usage status request is combined with another message from the operation mode controller to the base station.

In some embodiments, the wakeup notification includes a set of UE IDs and the second base station is configured to perform a UE handover procedure for the set of UE IDs with the first base station.

In some embodiments, the resource usage information report includes a plurality of pairs of (UE ID, usage string), the usage string including a plurality of values indicating the resource usage of the UE associated with the UE ID within the resource usage measurement time interval. In some embodiments, the usage string is a binary string and a non-zero value in the binary string represents that the UE uses resources during a subframe corresponding to a position of the non-zero value in the binary string. In some embodiments, the usage string is a non-binary string and a non-zero value corresponding to a position in the non-binary string represents a percentage of physical resource blocks used by the UE during a corresponding subframe.

In some embodiments, the operation mode controller is configured to perform the operations for the first base station and a third base station if there is still active UE in the cell associated with the first base station after the handover procedure between the first base station and the second base station.

In some embodiments, the predefined condition is satisfied if a traffic load at the first base station is below a first predefined threshold level and a traffic load at the second base station is below a second predefined threshold level such that the first base station can enter sleep mode and the second base station has enough capacity for handling the traffic load handed over from the first base station to the second base station.

In some embodiments, the sleep command includes a set of UE IDs and the first base station is configured to perform a UE handover procedure for the set of UE IDs with the second base station and then enter the predefined sleep mode.

An operation mode controller performing the method described above is disclosed.

In accordance with some embodiments, a method of controlling the operation mode of a base station, the method comprises: a first base station measuring resource usage for UE associated with the first base station; if the resource usage at the first base station is below a predefined threshold: the first base station sending a sleep mode request to a second base station, the request including an identifier of the first base station, an identifier of the second base station, a proposed sleeping interval, UE identity information and associated UE resource usage information; the first base station receiving a sleep mode response from the second base station, the response including the identifier of the first base station, the identifier of the second base station, an acceptance indicator, UE identity information and sleeping interval information corresponding to that in the sleep mode request; the first base station starting a handover process with the second base station in accordance with the UE identity information in the sleep mode response; and if there is no UE left in the first base station after a completion of the handover process and the first base station receives no further decline in the sleep mode response, the first base station entering a sleep mode; and if there is still UE left in the first base station after a completion of the handover process, the first base station may start a sleep mode negotiation with a third base station.

In some embodiments, the sleep mode request includes a plurality of pairs of (UE ID, usage string), the usage string including a plurality of values indicating the resource usage of the UE associated with the UE ID within a resource usage measurement time interval. In some embodiments, the usage string is a binary string and a non-zero value in the binary string represents that the UE uses resources during a subframe corresponding to a position of the non-zero value in the binary string. In some embodiments, the usage string is a non-binary string and a non-zero value corresponding to a position in the non-binary string represents a percentage of physical resource blocks used by the UE during a corresponding subframe.

In some embodiments, the UE identity information in the sleep mode response is at least a subset of the UE identity information in the sleep mode request. In some embodiments, the sleep mode request and the sleep mode response include sleeping interval information, which is defined as sleeping start and end time in terms of SFN number.

In some embodiments, the first base station is configured to perform the operations recited above with a third base station if there is still active UE in the cell associated with the first base station after the handover procedure between the first base station and the second base station.

A base station performing the method recited above is disclosed.

BRIEF DESCRIPTION OF THE DRAWINGS

Different aspects of the present invention as well as features and advantages thereof will be more clearly understood hereinafter because of a detailed description of embodiments of the present invention when taken in conjunction with the accompanying drawings, which are not necessarily drawn to scale. Like reference numerals refer to corresponding parts throughout the several views of the drawings.

DESCRIPTION OF EMBODIMENTS

Figure 1A:
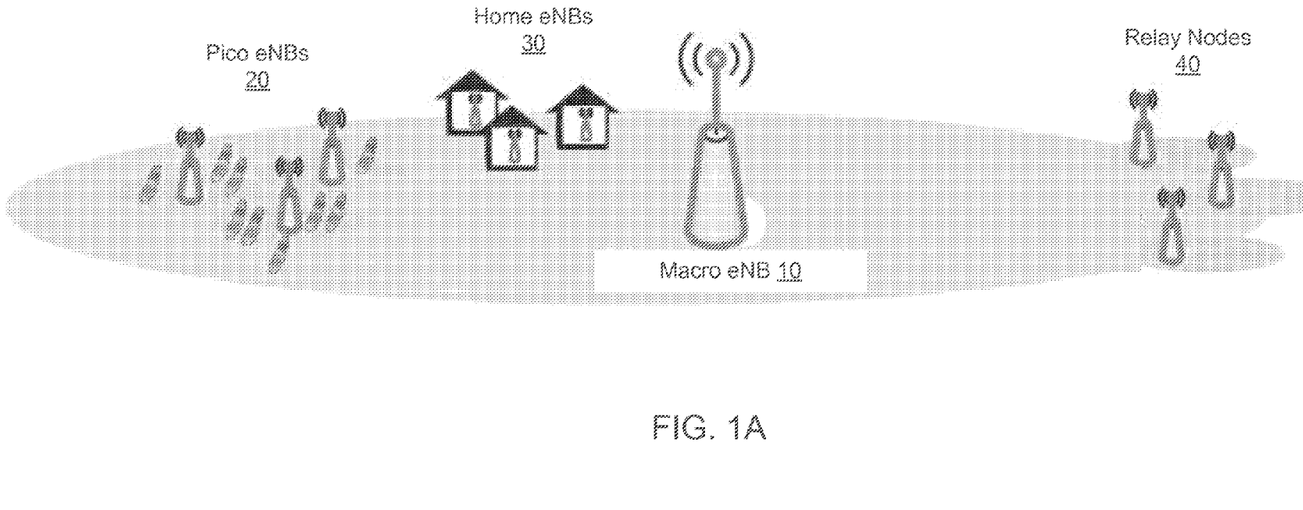
FIG. 1A depicts the deployment of multiple base stations with different types of coverage in accordance with some embodiments of the present application.

FIG. 1A depicts the deployment of multiple base stations with different types of coverage in accordance with some embodiments of the present application. As shown in the figure, there are four types of base stations, among which the macro eNB 10 has the largest service coverage, the pico eNBs 20 have smaller service coverage and the home eNBs 30 has the smallest service coverage. Sometimes, the macro eNB 10 is also referred to as a "macro cell" for creating a relatively large area of coverage and the other types of eNBs are commonly referred to as "low power nodes (LPN)." These low power base station nodes include remote radio heads, pico eNBs 20, home eNBs (HeNBs) 30, and similar components. Although having a smaller area of coverage than a macro cell, these LPNs are often deployed within an area covered by a macro cell to improve the quality and reliability of the service UE received in this area. The area of coverage created by a low power base station might be referred to as a pico cell, a femto cell, a hotzone cell, a small cell, or a similar term. In this application, the term "small cell" is used to refer the coverage created by those LPNs. The term "low power node" or "small cell eNB" are used interchangeably herein.

As shown in FIG. 1A, the heterogeneous network deployment consist of low power nodes being placed throughout a macro-cell layout. But, it is also possible to deploy standalone low power nodes without macro base stations. One difference between low power nodes and macro eNBs is the transmit power. For example, the maximum allowable transmit power of a macro eNB, a pico eNB, and a HeNB, are typically 46 dBm, 30 dBm, 20 dBm, respectively, for a 10 MHz carrier bandwidth.

Figure 1B:
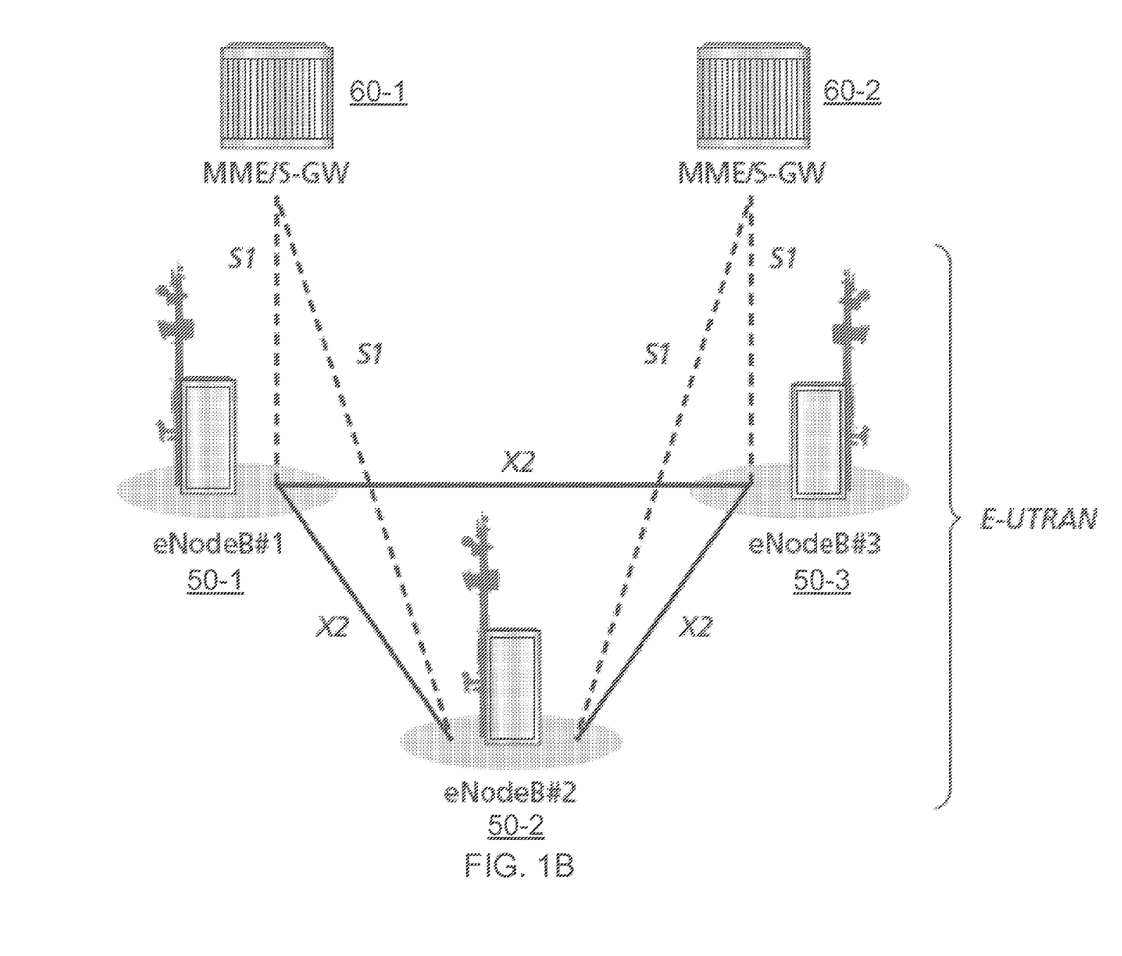
FIG. 1B depicts the communication interfaces between multiple base stations and mobile management entity (MME) servers in accordance with some embodiments of the present application.

Another difference between different types of low power nodes is the connection to the core network (i.e., backhaul) and the connection to neighbor cells. FIG. 1B depicts the communication interfaces between multiple base stations and mobile management entity (MME) servers in accordance with some embodiments of the present application. As shown in the figure, an eNB (50-1, 50-2, 50-3) may have a dedicated backhaul connection to the service provider's core network (e.g., the MME/S-GW servers 60-1 and 60-2) through the S1 interface defined in 3GPP and connections to other eNBs through the X2 interface defined in 3GPP). In some embodiments, a femto cell is a small cellular base station, typically designed for use in a home or small business. It connects to the service provider's core network via broadband (such as DSL or cable). As such, the HeNBs 30 in FIG. 1A may not have a direct interface like the X2 interface to other pico eNBs 20 or the macro eNB 10.

As noted above, energy consumption has become a more and more important issue for network operators due to a large number of base stations in the cellular networks. Although people have developed many schemes to find the minimal transmission power level that ensures the service coverage, quality, and capacity, these schemes by themselves are not sufficient to reduce the overall energy consumption of wireless networks because a large part of energy consumption remains consumed even at a low output transmit power level. This is partly due to the energy consumption by those load-independent components as well as the presence of control channels and common reference signals.

Recently, the heterogeneous network design of having multiple small cells deployed within a macro cell is becoming a very attractive solution, especially for providing better user experience in the outdoor/indoor high-traffic areas. An important nature of the heterogeneous network design is that the network traffic may be off-loaded from a macro eNB to a LPN or from one LPN to another LPN. For example, in a densely-populated urban region (e.g., a large shopping mall, etc.), many small cell low power nodes are deployed to support a large amount of data traffic.

On the other hand, the traffic load at any base station (macro or micro) may go up and down during a predefined time period (e.g., a day). Considering the traffic load fluctuation, it is possible to switch off a small cell base station when the traffic load is light. For example, when there is no UE in a small cell, or there is no active UE or connected UE in the small cell, or all the UE attached to the small cell are in idle mode or sleep mode, etc., the small cell base station may turn off its RF receiving/transmit circuitry completely. Alternatively, the small cell may turn off its RF transmit circuitry while keeping its RF receiving circuitry on, or make itself available or active in limited resources such as time and/or frequency in the air interface.

By implementing the idle/sleep mode, a network operator can reduce the energy consumption when a small cell base station enters the idle or sleep mode by turning off its transmit and/or receiving circuitry. Another benefit from this adaptive power consumption scheme is that it can reduce the interference to other macro and/or small cells especially in a densely-populated region. However, there are a number of issues that need to be addressed in order to support the sleep mode of a base station (which may be a macro eNB or a LPN). Exemplary issues include when the base station should enter the sleep mode, when and how to wake up a base station in the sleep mode, how to handle the UE connected to a base station that is going to enter the sleep mode, etc.

In general, a base station should enter the sleep mode when its traffic load is lower than a predefined level, which may adversely affect the coverage provision and/or traffic balance in the neighboring cells. Therefore, other base stations should be notified of a base station's sleep mode parameters (e.g., the start time and time duration, etc.) so that they can coordinate with each other to reduce the negative impact on the coverage provision.

Exemplary embodiments of the present invention will be described below in the context of a wireless communication system as shown in FIGS. 1A and 1B. As noted above, a wireless network is usually composed of a plurality of macro base stations in a cellular deployment. Within the coverage area of each macro base station, a set of small cells is deployed, forming a second layer, operated by the same operator. Very often, the small cells are deployed at hotspots of large capacity for offloading traffic from a corresponding macro base station. The small cells may be connected to the macro base station via an interface (e.g., X2 interface in the case of the operator-deployed open access small cells, or S1 interface in the case of the user-deployed closed access small cells.

In the present application, an exemplary sleep/wakeup mechanism is described as follows: when a small cell is not highly loaded and a neighboring macro base station or another small cell can handle the traffic from/to the small cell while offering users satisfactory QoS, the small cell should enter sleep mode. As the traffic load at the macro base station or the other small cell increases, one or more small cells need to be switched on depending on the traffic load and localization of traffic. In some embodiments, the base station that enters the sleep mode may not transmit any signal to UE in the air interface. In some embodiments, the base station may still transmit limited signals such as Synchronization CHannel (SCH) (or preambles) or Broadcast CHannel (BCH) (or some essential system information blocks) to UE, but it transmits fewer signals than it does during the active mode. On the other hand, the base station may still communicate with other base stations and the core network via a backhaul during the sleep mode.

Figure 2A:
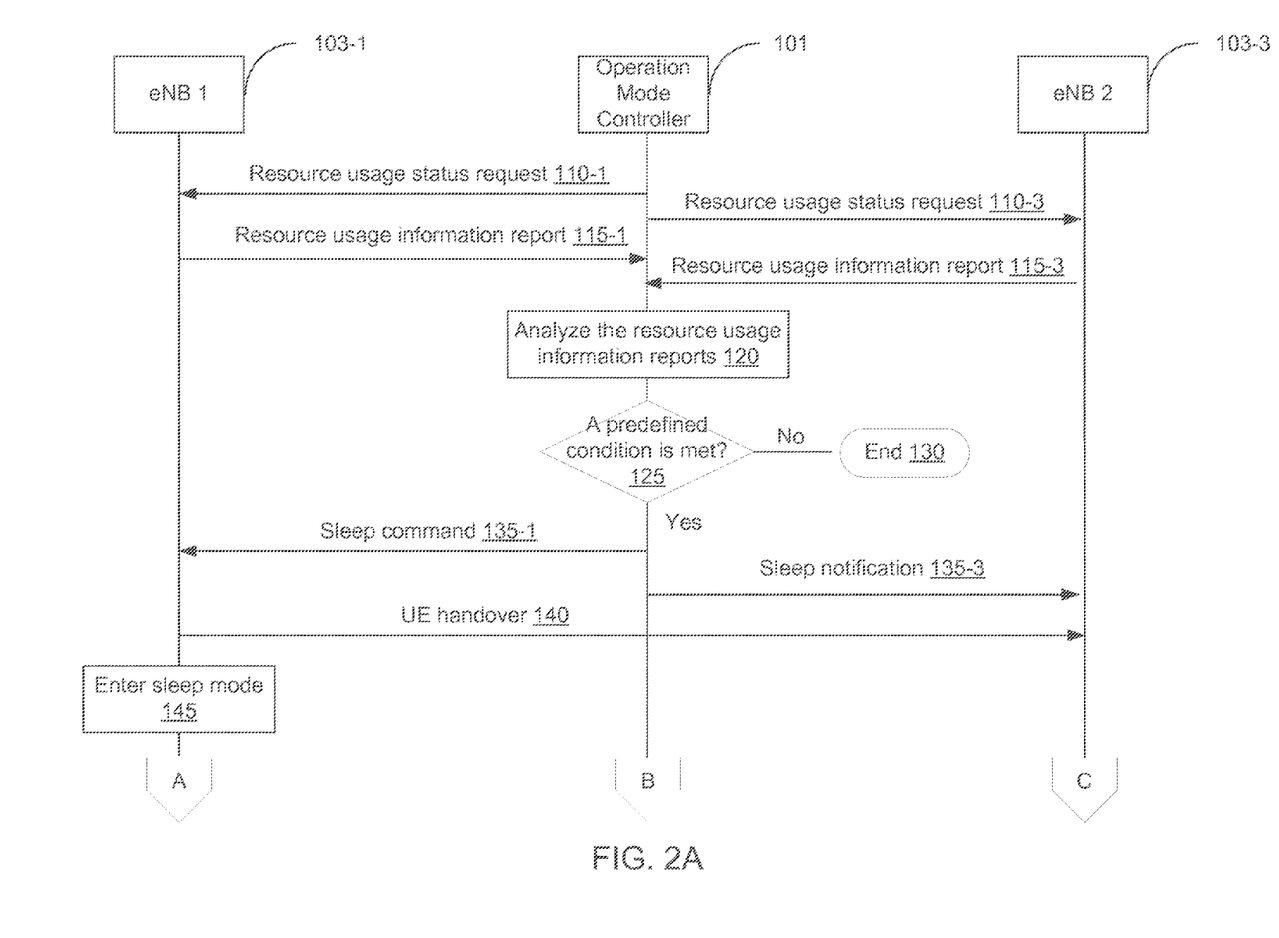
FIGS. 2A and 2B are flow charts illustrating how an operation mode controller coordinates the operation of multiple base stations in accordance with some embodiments of the present application.
Figure 2B:
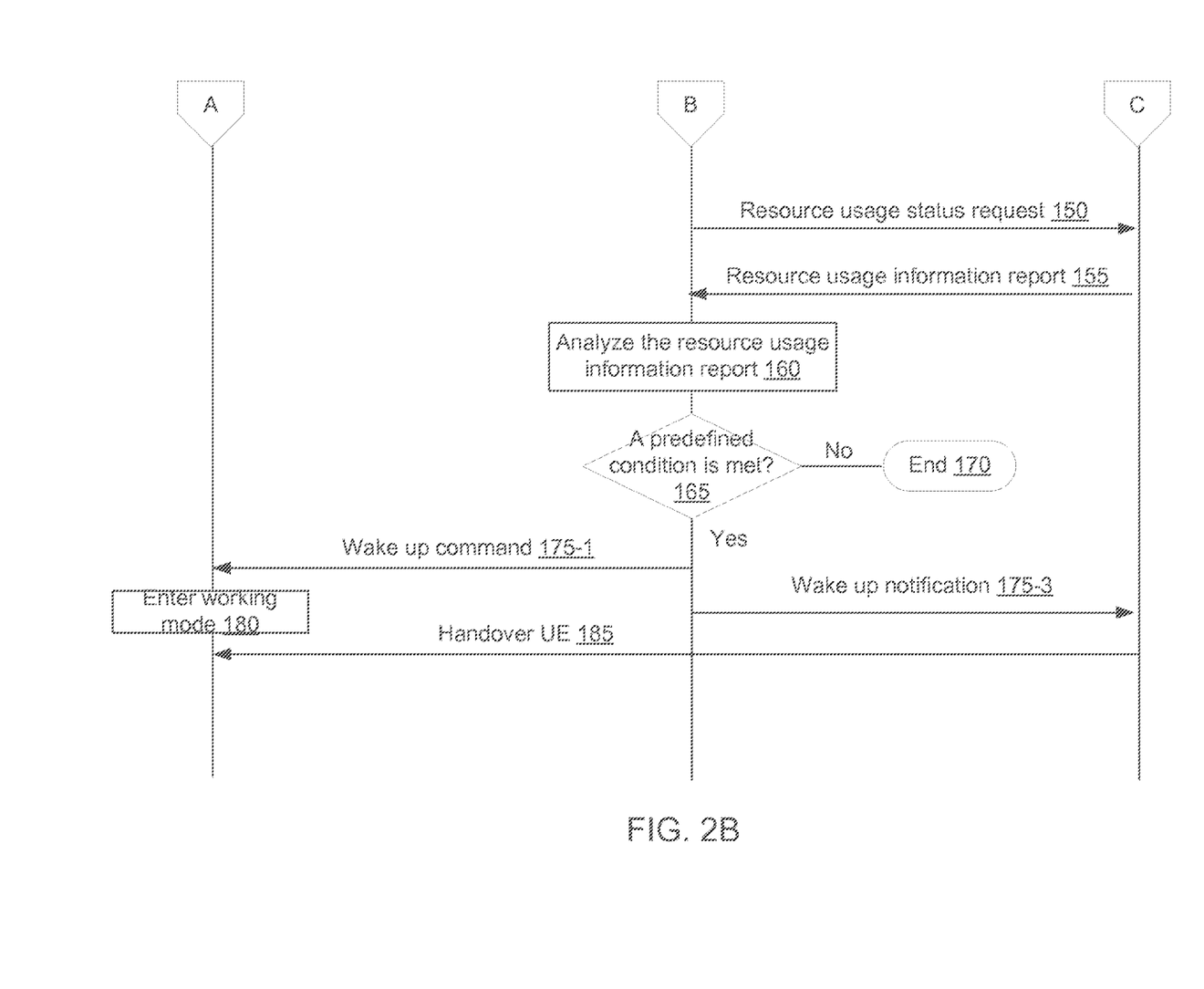

FIGS. 2A and 2B are flow charts illustrating how an operation mode controller 101 coordinates the operation of multiple base stations (103-1, 103-3), sleep/wakeup mode, in a centralized way in accordance with some embodiments of the present application. In some embodiments, the function of sleep/wakeup control is performed by a new network entity, or a virtual entity in the network, which can be either implemented in the gateway or distributed in the base stations. In this example, this function is implemented in the existing network entities such as an MME server or a macro base station whose coverage may overlap with that of one or more small cells. The operation model controller 101 makes decisions about when a base station should enter or leave sleep mode based on some information such as the traffic load and user localization. In other words, the information of the positions of UE in a particular macro/small cell is available to the controller if the controller is implemented in the MME server where UE location information is available for mobility management purpose. Alternatively, the UE location information may also be available if UE reports its location information using the GPS equipment in the UE. Sometimes, the UE location information can be estimated by network positioning techniques. Note that in the following description, it is assumed the UE location information (relative or absolute, rough or accurate) is available and the details of how to obtain this location information is well-known to those skilled in the art and not within the scope of the present application.

In order to effectively control one or many small cells to enter and leave sleep mode, the operation mode controller 101 needs to know the traffic load and the UE service requirement of a particular small cell. In the current 3GPP LTE specifications, the traffic load in terms of physical resource block (PRB) utilization may be exchanged on the X2 interface between different cells. Note that such traffic load information itself is not enough for the operation mode controller 101 because that the PRB utilization information only reveals the resource usage in the frequency domain and it is a cell-level statistics that combines the statistics for all UE within the cell. To overcome this problem, a base station may need to report the resource usage per UE as well as the combined cell-level resource usage when requested by the operation mode controller 101.

Figure 2C:
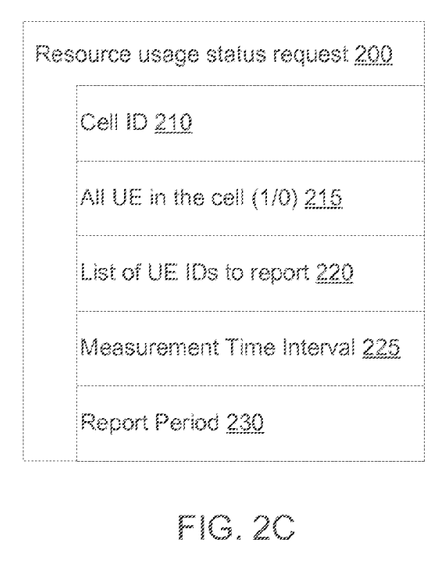
FIGS. 2C-2E are block diagrams illustrating different messages exchanged between the operation mode controller and the base stations in accordance with some embodiments of the present application.

As shown in FIG. 2A, the operation mode controller 101 sends resource usage requests 110-1 and 110-3 to the respective base stations, eNB1 103-1 and eNB 2 103-3. In some embodiments, the operation mode controller 101 sends the resource usage status request to a base station either periodically or on-demand, which may be transmitted on the X2 interface. The structure of an exemplary resource usage status request 200 is shown in FIG. 2C. In some embodiments, the resource usage status request 200 is a standalone message transmitted on the X2 interface. In some other embodiments, the request may be combined with other information into one message. Below is a table explaining the meaning of attributes in the resource usage status request 200 shown in FIG. 2C:

| Attribute | Meaning |
| --- | --- |
| Cell ID 210 | An identifier of a target cell that receives this request message |
| All UE in cell (1/0) 215 | '1' means that the base station should report all UE usage information of this target cell; '0' means that the base station should report only resource usage information by the identified UE |

-continued

| Attribute | Meaning |
| --- | --- |
| List of UE IDs to report 220 | If the "All UE in cell" attribute is '0', the operation mode controller should provide a list of UE IDs whose usage information need to be reported by the base station |
| Measurement Time Interval 225 | The length of a period during which the resource usage for UE in the target cell is measured. For example, the value of this attribute may be defined as a number of subframes. |
| Report period 230 | The period for the base station to submit a resource usage information report. Note that '0' means the report is once while other values indicate the report is periodical. |

Figure 2D:
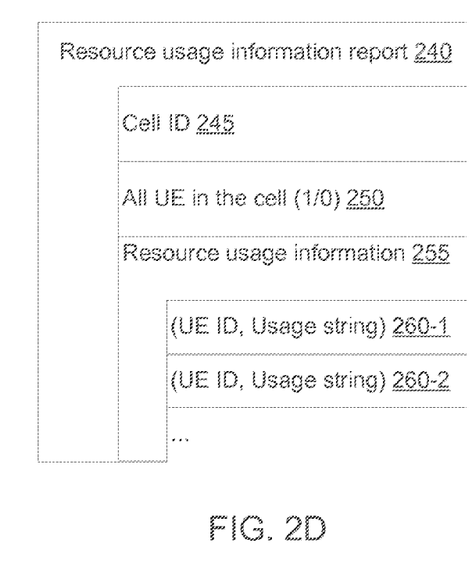

Upon receipt of the resource usage status request, the two base stations, eNB 1 and eNB2, each respond with a resource usage information report 115-1 and 115-3, respectively. In some embodiments, the resource usage information is in the time domain. An example of the resource usage information report 240 from a base station to the operation mode controller is shown in FIG. 2D. In some embodiments, the resource usage information report 240 is a standalone message transmitted on the X2 interface. In some other embodiments, the report may be combined with other information into one message. Below is a table explaining the meaning of attributes in the resource usage information report 240 shown in FIG. 2D:

| Attribute | Meaning |
| --- | --- |
| Cell ID 245 | An identifier of a target cell that submits this report message. |
| All UE in cell (1/0) 250 | '1' means that the report includes all UE usage information in the cell. This value corresponds to the same one contained in the resource usage status request 200. |
| Resource usage information 255 | This attribute includes a plurality of pairs of (UE ID, usage string) 260-1 and 260-2, etc. For each UE ID, the measured UE usage information is defined as a usage string, wherein each position in the usage string represents a DL subframe, for which a non-zero value indicates the amount of resource utilized by that UE. The length of the usage string is defined by the "Measurement Time Interval" attribute in the resource usage status request message. In some embodiments, if the "All UE in cell" attribute is '0', this attribute only contains a plurality of usage strings, one for each UE ID in the UE list in the resource usage status request message. |

In some embodiments, the usage string is a binary string such that a value "1" in the string indicates that a corresponding subframe is used by that UE and a value "0" in the string indicates otherwise. In some other embodiments, the UE resource usage information is defined as a non-binary string, whose value represents the percentage of the amount of resources used by that UE in a subframe. For example, the numerator of the percentage calculation corresponds to the number of physical resource blocks within the subframe used by the UE while the denominator of the percentage calculation is the total number of physical resource blocks in that subframe.

The operation mode controller 101 then analyzes the resource usage information reports coming from different base stations (120) and determines if they satisfy a predefined condition (125). For instance, if a report from one eNB indicates no active UE in a cell (e.g. all "0" in the list of UE resource usage information entry), the operation mode controller 101 may consider that cell to be a candidate cell for entering sleep mode. In another example, if a report from one eNB indicates low traffic load in a cell (e.g. very few "1" in the list of UE resource usage information entry) and its neighboring cells are not over loaded, the operation mode controller 101 may consider that cell to be a candidate for entering sleep mode. In some embodiments, a threshold is defined to determine whether the traffic load at a particular cell is low or not. Such threshold may be predefined and stored in the operation mode controller or dynamically calculated by the operation mode controller.

Figure 2E:
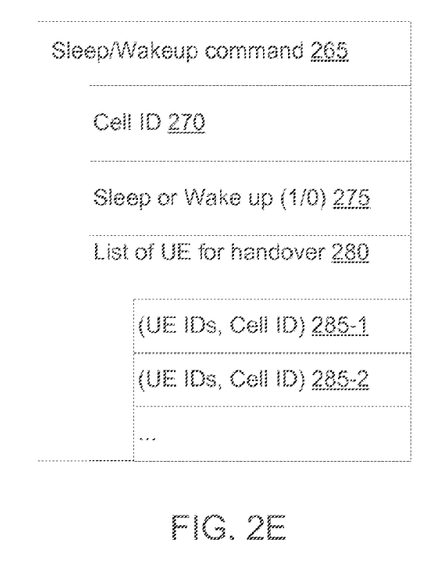

If the predefined condition is not met (125—No), the operation mode controller 101 may end this attempt of causing any base station to enter sleep mode. In some embodiments, the operation mode controller 101 may restart the process at a later time by resending resource usage status requests to the base stations. In some embodiments, the base stations periodically submits their resource usage information reports to the operation mode controller 101 so that the controller can reevaluate the usage status at different base stations. Assuming that the predefined condition is met (125—Yes), the operation mode controller 101 identifies the cell that can enter the sleep mode and sends a sleep command 135-1 to the base station eNB 1 associated with the cell. In addition, the operation mode controller 101 sends a sleep notification 135-3 to neighboring base stations including the base station eNB 2, alerting that the base station eNB 1 will enter the sleep mode. An example of the sleep/wakeup command 265 from the operation mode controller to a base station is shown in FIG. 2E. In some embodiments, the sleep/wakeup command 265 is a standalone message transmitted on the X2 interface. In some other embodiments, the command may be combined with other information into one message. Below is a table explaining the meaning of attributes in the sleep/wakeup command 265 shown in FIG. 2E:

| Attribute | Meaning |
| --- | --- |
| Cell ID 270 | An identifier of a target cell that receives this command message. |
| Sleep or Wake Up (1/0) 275 | "1" means the target cell will enter sleep mode; "0" means the target cell will stay active or leave sleep mode after receiving this message. |
| List of UE for handover 280 | If the 'Sleep or Wake up' entry is "1", the base station at the target cell needs to handover those active UE to neighboring cells in order to enter sleep mode. In this case, this entry includes a list of pairs of (UE ID, cell ID), the cell ID representing a corresponding cell to which the UE will be handed over. If the 'Sleep or Wake up' entry is "0", the target cell should wake up and expect some UE handed over from neighboring cells. In this case, this entity includes a list of pairs of (UE ID, cell ID), the cell ID representing a corresponding cell from which the UE will be handed over. |

As shown in FIG. 2A, after completing the UE handover (140), the base station eNB 1 may enter sleep mode (145) if there's no active UE left in the cell. If the base station eNB 2 does not have the capacity of handling all the UE from the base station eNB 1, the operation mode controller 101 may need to find another base station for receiving the remaining UE handed over from the base station eNB 1. Note the details of UE handover procedures and the corresponding X2 messages are known in the art.

FIG. 2B illustrates a process of waking up a base station in the sleep mode in accordance with some embodiments of the present application. Before waking up a small cell in the sleep mode, the operation mode controller makes some predictions of the load information. Such load information can be, for instance, derived from localization methods, based on localization algorithms such as by exploiting traffic information in neighboring sites of that sleep mode cell. In this example, the operation mode controller 101 sends a resource usage status request 150 to a base station and receives a resource usage information report 155 from the base station. Note that the operation mode controller 101 may communicate with multiple base stations to learn their traffic load and analyzes the reports 160 to determine whether a predefined condition is met or not (165). For example, when the resource usage information reports from several neighboring cells of one sleep mode cell indicate an overall high traffic load (e.g. no "0" in the list of UE usage information entries) in that particular area, the operation mode controller 101 may consider waking up the cell in the sleep mode by sending a wake up command 175-1 to offload the traffic and/or to provide QoS to UEs, which otherwise cannot be met. A threshold can be defined to determine whether the traffic load is high or not. Such threshold may be predefined and stored in the operation mode controller or dynamically calculated by the operation mode controller. In response to the wakeup command, the base station eNB 1 enters the work mode 180. In some embodiments, the operation mode controller 101 also sends a wake notification 175-3 to a neighboring base station eNB 2, the notification instructing the base station to start the handover procedure 185 for some of the UE so as to take away some traffic load from the base station.

Figure 3A:
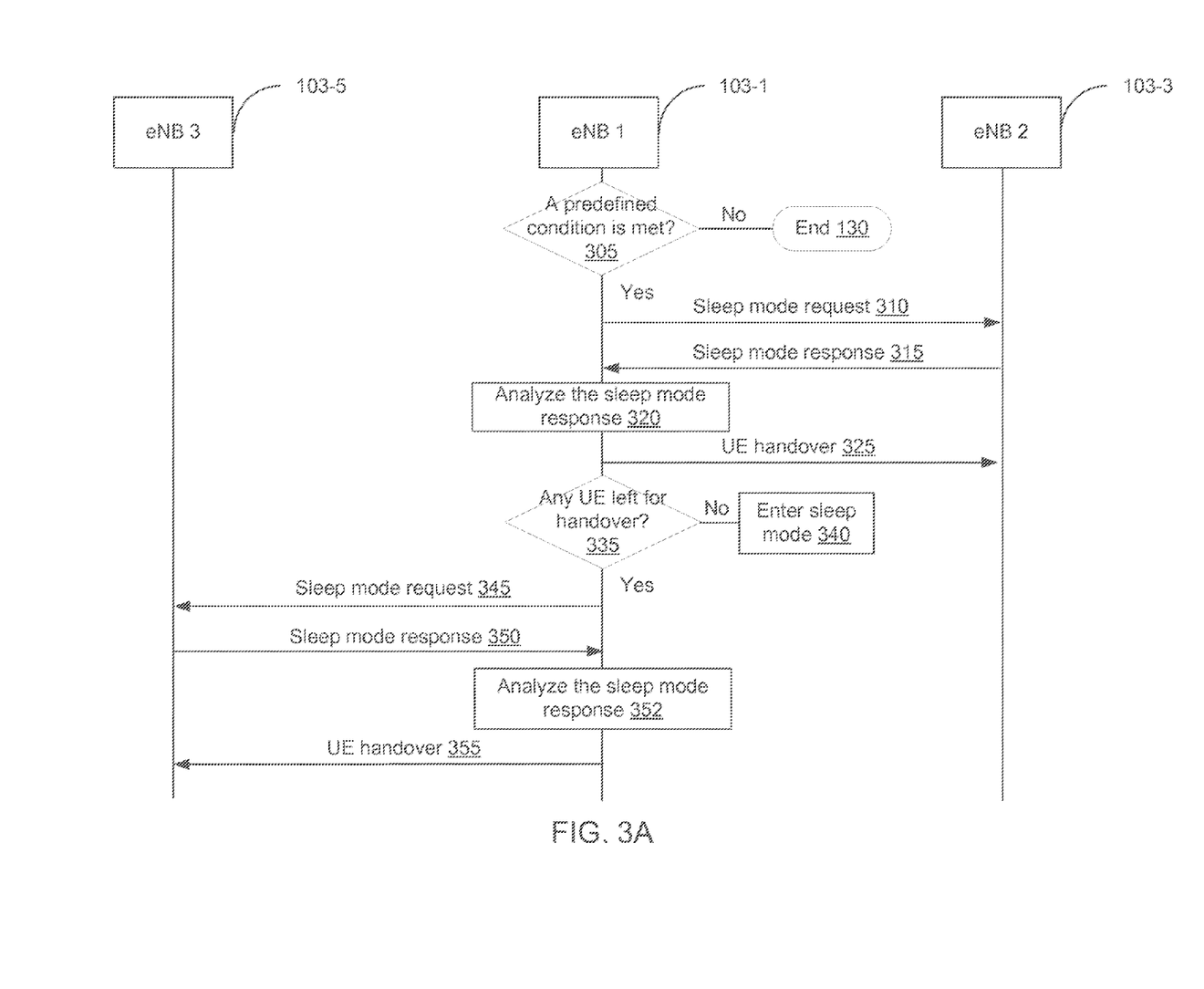
FIG. 3A is a flow chart illustrating how one base station coordinates its operation with multiple base stations in accordance with some embodiments of the present application.
Figure 3B:
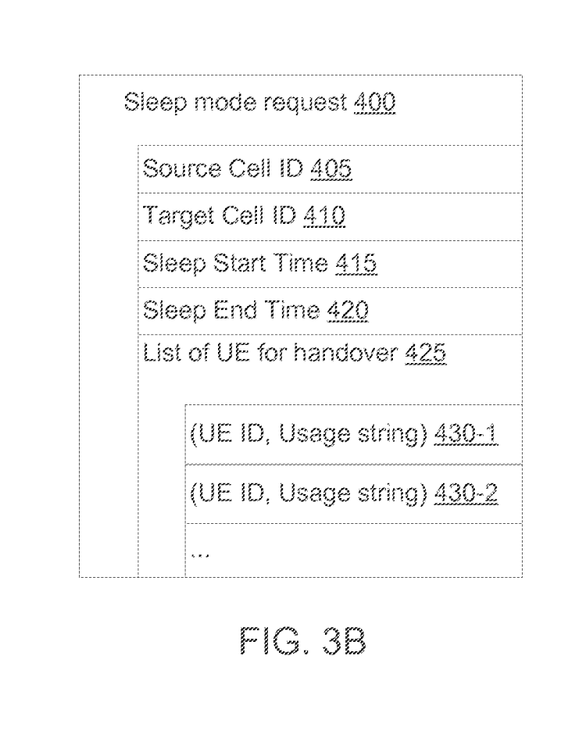
FIGS. 3B and 3C are block diagrams illustrating different messages exchanged between the base stations in accordance with some embodiments of the present application.

FIG. 3A is a flow chart illustrating how one base station coordinates its operation with multiple base stations in accordance with some embodiments of the present application. In this example, the function of sleep/wake up mode is performed in a distributed way and there is no centralized operation mode controller. As shown in the figure, the base station eNB 1 103-1 has two neighboring base stations, eNB 2 103-3 and eNB 3 103-5. The base station eNB 1 first checks whether a predefined condition is met or not (305). In some embodiments, the base station periodically checks whether its traffic load is below a threshold (e.g., a predefined fixed or dynamic calculated load parameter). If the condition is met (305—Yes), this base station sends a sleep mode request message 310 to its neighboring sites (including the macro cell) such as the base station eNB 2. An example of a sleep mode request 400 from a base station is shown in FIG. 3B. In some embodiments, the sleep mode request 400 is a standalone message transmitted on the X2 interface. In some other embodiments, the sleep mode request 400 may be combined with other information into one message. Below is a table explaining the meaning of attributes in the sleep mode request 400 shown in FIG. 3B:

| Attribute | Meaning |
| --- | --- |
| Source cell ID 405 | An identifier of a source cell that sends this request message. |
| Target cell ID 410 | An identifier of a target cell that received this request message. |
| Sleep start time 415 and sleep end time 420 | The proposed start and end time for the source cell to enter sleep mode. For example, the time can be defined as the SFN number. |
| List of UE for handover 425 | A list of UE that the source cell wants to hand over to the target cell in order to enter sleep mode. In some embodiments, this entry includes a plurality of pairs of (UE ID, usage string) 430-1 and 430-2. For each UE ID, each position in the usage string represents a DL subframe, for which a non-zero value indicates the amount of resource utilized by that UE. The usage string is a UE resource usage history in the source cell. The length of the usage string may be 10 or longer. |

Figure 3C:
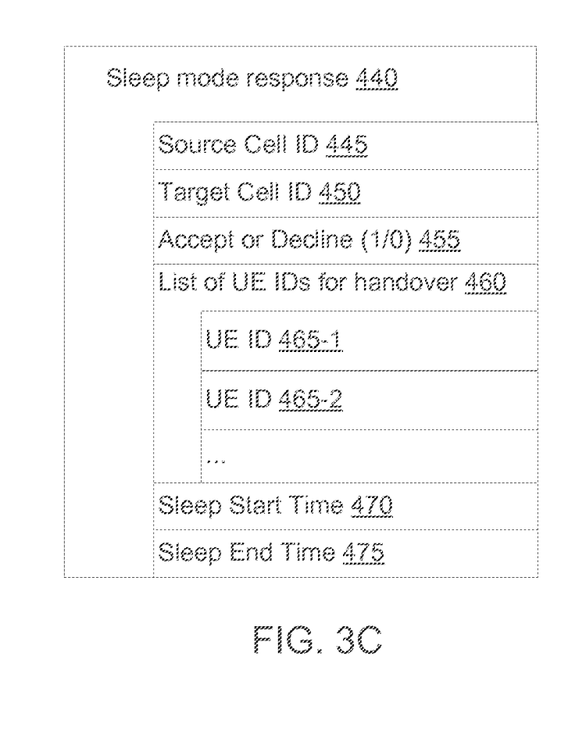

Based on its own traffic load, a base station that receives this sleep mode request determines the amount of resource it has to accommodate the list of UE IDs in the sleep mode request from the source cell and then replies an acceptance in a sleep mode response 315 to the source cell. Note that a base station that has a high traffic load and/or expect more UE may enter its service coverage may decline the request in the sleep mode response message. An example of a sleep mode response 440 from a base station is shown in FIG. 3C. In some embodiments, the sleep mode response 440 is a standalone message transmitted on the X2 interface. In some other embodiments, the sleep mode response 440 may be combined with other information into one message. Below is a table explaining the meaning of attributes in the sleep mode response 440 shown in FIG. 3C:

| Attribute | Meaning |
| --- | --- |
| Source cell ID 445 | An identifier of a source cell that sends the request message 400. |
| Target cell ID 450 | An identifier of a target cell that received the request message 400. |
| Acceptance or decline (1/0) 455 | "1" means the base station associated with the "target cell ID" accepts a UE handover from the base station associated with the "source cell ID" that wants to enter sleep mode; "0" means the base station associated with the "target cell ID" declines the UE handover from the base station associated with the "source cell ID" that wants to enter sleep mode. |
| List of UEs for handover 460 | A list of UE IDs (465-1, 465-2, . . . ) associated with the based station identified by the "source cell ID" attribute that the base station associated with the "target cell ID" attribute can accommodate. For example, if the 'Acceptance or decline' is "1", then this UE list contains the same list of UE IDs in the original "sleep mode request" message. Sometimes the list of UEs for handover may be empty in this case. Otherwise, if the 'Acceptance or decline' is "0", then this UE list may contain a subset of the original UE ID list in the "sleep mode request" message that the base station can accommodate or empty. |
| Sleep start time 470 and sleep end time 475 | The start and end time for the source cell identified by the "source cell ID" attribute to enter sleep mode, which correspond to the two attributes 415 and 420, respectively. |

After analyzing the sleep mode response message (320), the source cell base station eNB 1 may start the UE handover procedure 325 for the UE listed in the non-empty "List of UE for handover" attribute in the sleep mode response 315 with its neighboring cells. Again, the details of UE handover procedures and the corresponding X2 messages are known in the art. Note that the UE handover procedure 325 happens only when the "List of UEs for handover" attribute 460 in the sleep mode response 315 is not empty.

If there is still active UE left at the source cell (335—yes) after the handover with the base station eNB 2, the base station eNB 1 may start a new round of a sleep mode request 345, a sleep mode response 350, an analysis of the sleep mode response message 352, and a handover procedure 355 with another neighboring cell (e.g., base station eNB 3). In other words, the base station eNB 1 103-1 iteratively negotiates with its neighboring cells to hand over all the UE to the neighboring cells. This could happen after several rounds of decline response and partial UE handover in each round with the last round sleep response being acceptance. Only after there is no active UE in the source cell at the base station eNB 1 and it receives no decline in the sleep mode response message from the last neighboring cell to which it sends its sleep mode request, the base station eNB 1 may enter the sleep mode (340) at the start time and then leaves sleep mode at the end time, both of which are in the sleep mode request.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

I claim:

1. A method of managing the operation mode of a first base station and a second base station using an operation mode controller, the method comprising:
   sending, from the operation mode controller, a respective resource usage status request to each of the first base station and the second base station, the request including a cell ID, UE identity information, and a resource usage measurement time interval;
   receiving, at the operation mode controller, a respective resource usage information report from each of the first base station and the second base station, the report including a cell ID, UE identity information, and UE resource usage information measured within a corresponding resource usage measurement time interval;
   when the UE resource usage information associated with the first base station and the second base station satisfies a predefined condition:
   sending a sleep command to the first base station, the sleep command including instructions for the first base station to hand over its UE to the second base station; and
   sending a sleep notification to the second base station, the sleep notification indicating that the first base station is going to enter a predefined sleep mode.

2. The method of claim 1, wherein the operation mode controller operates on a mobility management (MME) server.

3. The method of claim 1, wherein the UE identity information in the resource usage status request includes a parameter requiring that a base station report the resource usage of every UE within a cell associated with the base station.

4. The method of claim 1, wherein the UE identity information in the resource usage status request includes a set of UE IDs, each UE ID identifying a respective UE within a cell associated with the base station for which the base station should report its resource usage.

5. The method of claim 1, wherein the resource usage status request includes a parameter indicating whether the base station should report the resource usage of every UE within a cell associated with the base station in a periodic manner.

6. The method of claim 1, wherein the resource usage status request is a complete message by itself.

7. The method of claim 1, wherein the resource usage status request is combined with another message from the operation mode controller to the base station.

8. The method of claim 1, wherein the resource usage information report includes a plurality of pairs of UE ID, usage string, the usage string including a plurality of values indicating the resource usage of the UE associated with the UE ID within the resource usage measurement time interval.

9. The method of claim 8, wherein the usage string is a binary string and a non-zero value in the binary string represents that the UE uses resources during a subframe corresponding to a position of the non-zero value in the binary string.

10. The method of claim 8, wherein the usage string is a non-binary string and a non-zero value corresponding to a position in the non-binary string represents a percentage of physical resource blocks used by the UE during a corresponding subframe.

11. The method of claim 1, wherein the predefined condition is satisfied if a traffic load at the first base station is below a first predefined threshold level and a traffic load at the second base station is below a second predefined threshold level such that the first base station can enter sleep mode and the second base station has enough capacity for handling the traffic load handed over from the first base station to the second base station.

12. The method of claim 1, wherein the sleep command includes a set of UE IDs and the first base station is configured to perform a UE handover procedure for the set of UE IDs with the second base station and then enter the predefined sleep mode.

\* \* \* \* \*